Dec. 24, 1963 C. GERLETZ 3,114,934
PRESSURE FORMING APPARATUS FOR THERMOPLASTIC SHEET MATERIAL
Filed March 1, 1961
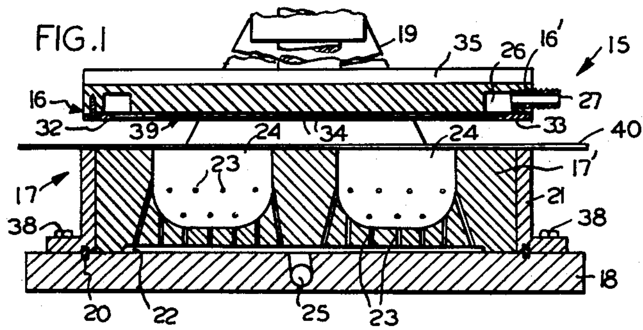
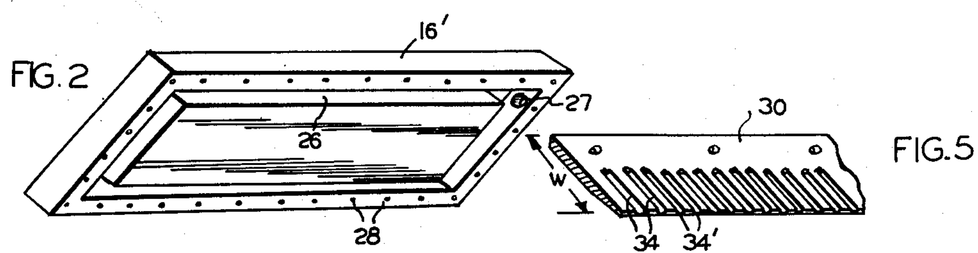
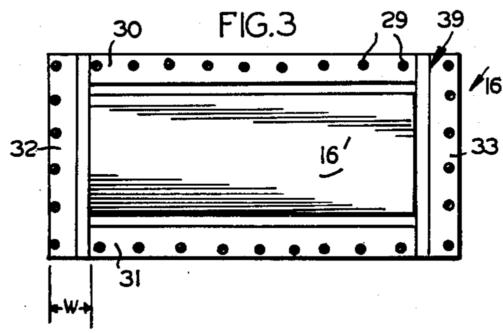
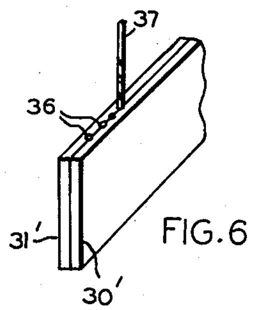
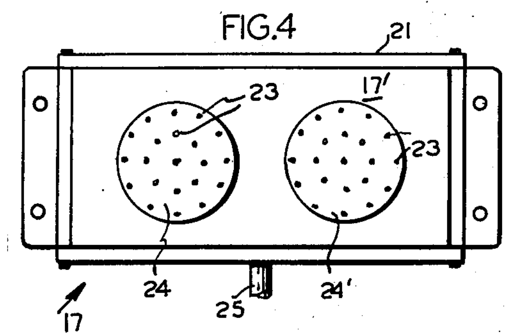
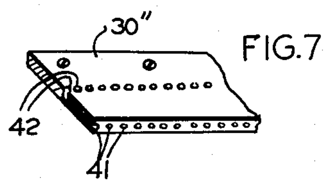
INVENTOR,
CHARLES GERLETZ,
BY
ATTORNEY United States Patent Office 3,114,934 Patented Dec. 24, 1963

3,114,934

PRESSURE FORMING APPARATUS FOR THERMOPLASTIC SHEET MATERIAL

Charles Gerletz, Bridgeport, Conn., assignor to Tronomatic Machine Mfg. Corp., Bronx, N.Y., a corporation of New York Filed Mar. 1, 1961, Ser. No. 102,619
10 Claims. (Cl. 18—19)

The present invention relates to novel and improved construction in pressure-forming apparatus working on thermoplastic sheeting, such apparatus being of the type where a thermoplastic sheet laid to cover open-top mold cavities, is heated by an upper plate which it is made to contact and then, compressed air is blown from orifices discharging from the bottom of said plate against said sheet to force it into said mold cavities and thus made to assume the cavity contours. Capillary vents through the mold body from the mold cavities, afford escape of air which would otherwise hinder contact of plastic to mold. This is aided by the application of vacuum to said vents while compressed air plays on the sheet from said orifices in the "blow plate" as it is commonly called. To make the sheet be in full surface contact with said plate to accomplish proper heating and hence softening thereof to condition it to be drawn into said mold cavities, vacuum may be applied to said orifices in the plate simultaneously with the application of compressed air to said vents before the forming operation.

Heretofore, the blow plate needed a great number of orifices spread over its entire surface. These openings had to be of capillary size otherwise the hole edges would mar the softened sheet. The usual diameter of such orifices being that of a #80 drill (0.0135″), the cost of the heretofore used blow plate is rather expensive because of the amount of delicate work involved to make it. Further, the forceful thin air streams issuing from said orifices against the sheet surface, also mar the sheet and the capillary size of said orifices preclude the quick passage of the required compressed air volume for the forming operation and necessitated use of rather high pressures to overcome the resistance offered the passage of air through such orifices. Also in the prior practice, each mold had its own port for application of compressed air or vacuum as the case might be, to a confined space communicative with all the vents leading to the mold cavities and hence every time a mold was changed, the air and vacuum supply had to be disconnected from the old and connected to the new mold.

It is therefore an object of this invention to provide a novel and improved construction for the application of pneumatic power in pressure-forming apparatus of the character described, affording a rapidly-supplied large volume of compressed air through the blow plate, a blow plate of cheaper construction and the elimination of damage to the sheet material being worked on, and further, operation is efficient with the use of lower air pressures.

Another object thereof is to provide a novel and improved construction for the application of pneumatic power in pressure forming apparatus of the character described, affording rapid merging of all the individual streams of air issuing from the discharge orifices of the blow plate.

A further object thereof is to provide novel and improved construction of the character set forth, offering an association of the mold structure and the table supporting it, that the pneumatic power supply is automatically connected for passage through the mold's vents upon the mounting of the mold onto said support.

Still another object of this invention is to provide apparatus of the class described, having the novel and improved attributes set forth, which is easy to manipulate and use, reasonable in cost and efficient in carrying out the purpose for which it is designed.

Other objects and advantages will become apparent as this disclosure proceeds.

For the practice of this invention, one form it may assume is to have the blow plate comprised of a solid plate member having a channel in its underside, near and around the plate's perimeter, the cross-sectional area of such channel being sufficient for the rapid transmission of such large quantity of compressed air supply as is required for efficient and quick accomplishment of the forming operation. A thin flat perimetral frame covering said channel, is secured to the underside of said plate; said frame being of strips screwed on to the plate, each of said strips having a multiplicity of flutes part way across, opening at the inside edge of the frame and extending across said channel where they end. It is evident that all of said flutes form nozzles with the plate, are communicative with said channel and discharge along the plate's undersurface towards plate center region. Said plate has a port opening which is communicative with said channel, for connection to a supply of pneumatic power which may be vacuum and compressed air selectively as determined by valve control means. The fluted strips can be changed for wider ones to give a lesser frame opening when the mold structure is of lesser base area, meaning, when a change is made for a smaller mold. The mold body proper is held by a chase or frame about its sides, said chase being releasably on the table support therefor which is fixed below the blow plate, said plate being mounted for movement towards and away from the mold. There is a well of slight depth in the bottom surface of the mold body to form a chamber with the table support which is communicative with the vents leading to the mold cavities, said table having a port leading to such chamber for connection to pneumatic power. There is a gasket between said table and the underside of the chase to seal said chamber.

In the accompanying drawing forming part of this specification, similar characters of reference indicate corresponding parts in all the views.

FIG. 1 is a front elevational sectional view of an apparatus embodying the teachings of this invention. A thermoplastic sheet is shown laid atop the mold structure, ready for the blow plate to be lowered thereon to commence the operation of having said sheet heated and then drawn into the mold cavities.

FIG. 2 is a perspective view of the blow plate, looking up at its bottom surface. The fluted strip frame is omitted to make the mentioned perimetral channel and its communicative port open to view.

FIG. 3 is a bottom view of the complete blow plate.

FIG. 4 is a top plan view of the mold structure and its chase.

FIG. 5 is a fragmentary perspective view of the fluted thin flat stock used to make a frame for attachment to the underside of the plate shown in FIG. 2.

FIG. 6 is a fragmentary perspective view showing how the flutes may be made.

FIG. 7 is a fragmentary perspective view of a frame strip of modified construction.

In the drawing, the numeral 15 designates generally a preferred form of this invention. In the press formation shown, the vertically movable platen is the blow plate indicated generally by the numeral 16, positioned directly above the mold structure denoted generally as 17, which is mounted on the table or bed 18, a stationery part on the machine frame 19. A gasket 20 around the underside of the mold's chase 21, seals the slight chamber 22 which is communicative with the capillary vent holes 23 leading to the mold cavities 24, 24′ and with the port 25 in the table 18. The blow plate's plate member 16′ has a marginal channel 26 in its underside and there is a port 27 to said channel. A series of tapped holes 28 are for the screws 29 to secure the flutted strips 30—33 against the plate's undersurface to form a thin flat frame therearound. Each flute 34 which is only part way across the strip, forms a nozzle with the plate 16', discharging at 34' towards the center lines of the plate, along its bottom surface. Said plate is provided with suitable heating means indicated at 35, which may be electric heaters. The ports 25 and 27 are connected to suitable valve means, not shown, for selective application of vacuum or compressed air to either port.

As previously mentioned, said flutes 34 are communicative with the channel 26 and end within the confines of said channel. The channel's cross-sectional area is sufficient for rapid flow of the required volume of compressed air and it is important to note that flutes 34 offer nozzle passages which are not capillary in size, but are comparatively much larger and are easily made. For instance as shown in FIG. 6, the flutes may be made by clamping two strips 30', 31' together and then drilling holes 36 with a ⅛" drill 37.

To set up the apparatus 15, the blow plate 16 is fitted with a frame 39 to encompass the mold cavities 24, 24'. That is, the strips 30—33 used, shall be of a suitable width "W" to accomplish this. The heaters 35 are actuated. The mold 17 is mounted by use of the bolts 38 to hold its chase which tightly contains the mold body 17', fast to the table 18. It is evident that the manifold chamber 22 is thus made automatically communicative with the port 25. We are now ready to operate.

A thermoplastic sheet 40 is laid over the mold structure. The heated blow plate is brought down onto the sheet 40. Now the operator may simultaneously apply vacuum to the port 27 and a supply of compressed air to the port 25. This causes the sheet's rim portion to be heated at the exposed faces of the strips 30—33 and becoming there softened, the action of the compressed air issuing from the mold's vents 23 against the underside of said sheet and the effect of the vacuum produced above the sheet, will force the sheet 40 flat against the entire undersurface of the blow plate 16, whereupon it is heated and thereby softened. Now vacuum may be applied to the port 25 while a supply of compressed air is fed into the port 27. This causes the sheet 40 to the drawn into the mold cavities 24, 24' and thereby made to conform to the cavity contours. The blow plate 16 is then raised after cutting off the air supply to the port 27. Application of compressed air to the port 25 will now aid the manual removal of the work from the apparatus.

It is to be noted that although the sheet 40 may be left with markings caused by its forced contact with the orifice edges 34', this would be in portions of the sheet which are trimmed away anyway. Also to be noted is that the streams of compressed air issuing from said orifices 34, are directed not directly against the sheet 40, but along the upper face thereof and said streams quickly merge as they first progressively "strip" the sheet from off the plate 16' and then due to the increasing volume of compressed air above the sheet, the latter by forces evenly spread over the entire top surface of the sheet which is within the confines of the frame 39, is forced into the mold cavities. At no time is said sheet 40 marred by action of the compressed air issuing against it from the port 27. The finished work comes out clean and is quickly accomplished because of the ease and rapidity of flow through the discharge orifices 34 which are of relatively large size as compared to the capillary ducts heretofore had through the blow plate.

For another construction for the frame strips which may afford still larger discharge orifices, reference is had to FIG. 7, where each nozzle is formed by the intersecting bores 41 and 42 as shown.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

The claims are:

1. In a pressure forming apparatus for drawing thermoplastic sheet material into an open mold cavity, a flat plate positioned opposite said mold, movable towards and away therefrom, a frame on the plate, presenting its inner edge immediately from that surface of the plate which faces the mold, said plate having a main air passage along the frame, said frame encircling the mold opening and having air passages which are communicative with said main passage and which discharge through the inner edge of the frame, said main passage having an intake port whereupon application of a supply of compressed air into said port, said air will flow along said main passage and be discharged at the inner edge of said frame.

2. An apparatus as defined in claim 1, wherein the air passages in the frame are arranged to discharge air therefrom along said surface of the plate.

3. An apparatus as defined in claim 1, wherein the main passage and the frame are along the perimeter of the plate.

4. An apparatus as defined in claim 1, wherein said main passage is a channel in said surface of the plate, covered by the frame.

5. An apparatus as defined in claim 1, wherein the frame is detachably secured to the plate.

6. An apparatus as defined in claim 1, wherein the frame is composed of strips detachably secured to the plate.

7. An apparatus as defined in claim 1, wherein said main passage is a channel in said surface of the plate, covered by the frame and wherein the passages in said frame are channels in and part way across the frame surface which is next to said plate surface.

8. An apparatus as defined in claim 1, wherein said main passage is a channel in said surface of the plate, covered by the frame and wherein the passages in said frame are holes therethrough, each of said holes having one of its open ends communicative with said channel and the other opening in the inner edge of said frame.

9. An apparatus as defined in claim 1, wherein the discharge ends of the passages in the frame are around the entire inner edge of said frame.

10. An apparatus as defined in claim 1, wherein the discharge ends of the passages in the frame are spaced holes along the entire inner edge of said frame.

References Cited in the file of this patent

UNITED STATES PATENTS

| | | |
|---|---|---|
| 912,092 | Droitcour | Feb. 9, 1909 |
| 2,691,797 | Bertleff et al. | Oct. 19, 1954 |
| 2,702,411 | Winstead | Feb. 22, 1955 |
| 2,911,677 | Weber | Nov. 10, 1959 |
| 2,917,783 | Olson et al. | Dec. 22, 1959 |
| 2,926,385 | Willson | Mar. 1, 1960 |